US010509716B2

(12) United States Patent
Ramalingam et al.

(10) Patent No.: US 10,509,716 B2
(45) Date of Patent: Dec. 17, 2019

(54) AUTOMATED RECOVERY OF FLIGHTED FEATURES BASED ON SERVICE REQUESTS

(71) Applicant: Microsoft Technology Licensing, LLC, Redmond, WA (US)

(72) Inventors: Vadivelan Ramalingam, Redmond, WA (US); Ilker Celikyilmaz, Redmond, WA (US); Esha Sharma, Redmond, WA (US); Divyachapan S. Padur, Redmond, WA (US); Donovan Isaak, Redmond, WA (US); Mark Gilbert, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/917,175

(22) Filed: Mar. 9, 2018

(65) Prior Publication Data
US 2019/0278691 A1    Sep. 12, 2019

(51) Int. Cl.
| | |
|---|---|
| G06F 9/44 | (2018.01) |
| G06F 11/36 | (2006.01) |
| G06F 8/65 | (2018.01) |
| G06F 8/71 | (2018.01) |

(52) U.S. Cl.
CPC .............. *G06F 11/368* (2013.01); *G06F 8/65* (2013.01); *G06F 8/71* (2013.01)

(58) Field of Classification Search
CPC ............. G06F 8/65; G06F 8/71; G06F 11/368
USPC .................................. 717/120–121, 126–127
See application file for complete search history.

(56) References Cited

U.S. PATENT DOCUMENTS

| | | | |
|---|---|---|---|
| 7,061,923 B2 * | 6/2006 | Dugan | H04M 15/90 370/396 |
| 7,512,584 B2 | 3/2009 | Keith, Jr. | |
| 7,954,090 B1 | 5/2011 | Qureshi et al. | |
| 8,812,911 B2 | 8/2014 | Plamondon | |

(Continued)

OTHER PUBLICATIONS

Justin Baker, "Feature Flag-Driven Development", 2015, DZone, retrieved from http://www.launchdarkly.com , 7 pages (Year : 2015).*

(Continued)

*Primary Examiner* — Ted T. Vo
(74) *Attorney, Agent, or Firm* — Michael Best & Friedrich LLP (57) ABSTRACT

Methods and systems for managing a flighted software feature. One embodiment provides a system for disabling a flighted software feature enabled for selected users in a computing environment. The system includes a memory storing instructions and an electronic processor coupled to the memory. The electronic processor configured to execute the instructions to determine a set of related service requests submitted by a plurality of users in the computing environment, and, for each of the plurality of users, query a server servicing the user for a list of flighted software features enabled for the user during a predetermined time period. The electronic processor is also configured to determine, based on the list of flighted software features enabled for each of the plurality of users during the predetermined time period, a common flighted software feature, and automatically disable the common flighted software feature for at least one of the plurality of users.

20 Claims, 4 Drawing Sheets

(56) References Cited

U.S. PATENT DOCUMENTS

| | | | |
|---|---|---|---|
| 9,038,054 B1 | 5/2015 | Kozak | |
| 9,396,093 B1 | 7/2016 | Enakiev et al. | |
| 9,426,162 B2 * | 8/2016 | Dabbiere | H04L 41/0843 |
| 9,645,836 B2 * | 5/2017 | Rothkopf | G06F 1/1626 |
| 2007/0282710 A1 | 12/2007 | Lim et al. | |
| 2012/0030123 A1 | 2/2012 | Ocko | |
| 2017/0108995 A1 | 4/2017 | Ali et al. | |

OTHER PUBLICATIONS

AWS Admin, "Continuous Delivery and Effective Feature Flagging with LaunchDarkly", 2016, retrieved from https://aws.amazon.com/blogs/startups/, 4 pages (Year: 2016).*

* cited by examiner

AUTOMATED RECOVERY OF FLIGHTED FEATURES BASED ON SERVICE REQUESTS

BACKGROUND

Embodiments described herein relate to systems and methods for disabling a flighted software feature enabled for selected users in a computing environment, and, in particular, relate to automatically determining a flighted software feature to disable based on feedback submitted by a plurality of users in the computing environment.

SUMMARY

Feature fighting, also known as feature toggling or feature switching, is a technique in which a feature or set of feature-related changes can be flagged to effectively turn the feature or set of features on or off in any computing environment, including production environments. Accordingly, feature fighting allows individual software features to be turned on and tested as soon as they are ready, without depending on other code. This flexibility allows integration of code changes early. Furthermore, by selectively limiting flighted software features to a subset of users of a computing environment, the impact of flighted features can be controlled and valuable telemetry data can be received and used to improve the flighted features or create further software features.

The scope or extent of a flighted software feature can be controlled, such as to enable the flighted software feature for particular users, a number or percentage of users, users located in a particular geographic area, particular types of users, or the like. Flighted software features can be introduced in stages or iterations, wherein each stage may include an increasing number of users. For example, a flighted software feature may be enabled for only 1% of users in a first iteration but may be enabled for 3% of users in a second iteration. In some embodiments, hashing techniques are used to determine whether a flight should be enabled for a particular user based on the scope defined for the flight.

Any number of software features may be flighted at a particular point in time for a computing environment. For example, it is not uncommon to have thousands of flights enabled for the same or different sets of users of a computing environment. Accordingly, in this situation, it is often difficult to know whether a particular flighted feature is causing a particular problem. For example, in some embodiments, flighted software features are introduced to users using a random or semi-random process, and the software developer controlling the flight is not informed of what particular users received a particular flighted feature. Thus, when one or more users of the computing environment report problems with the computing environment (referred to here as "service requests"), it is difficult to know whether a particular flighted software feature is causing a reported problem. In fact, existing methods rely on manual processes to identify a correlation between a service request and a particular flighted feature. Accordingly, due to the lengthy and error-prone nature of these processes, a user in a computing environment may experience problems due to a flighted feature for a long time even though the flighted feature could be easily disabled to resolve the problem.

Embodiments described herein relate to systems and methods for disabling flighted software features based on service requests submitted by users. As described in more detail below, when a spike or peak of related service requests are identified, the systems and methods described herein are configured to determine the users associated with the related service requests and determine what flights were recently enabled for each user. The flights enabled for the users can be compared to automatically determine a common flight. When such a common flight is determined, the common flight may be automatically disabled for all users, for those users submitting service requests, or a combination thereof. Accordingly, the systems and methods described herein automatically determine which flighted software features users have enabled and if the users who are submitting service requests have a common flighted software feature enabled.

For example, one embodiment provides a system for disabling a flighted software feature enabled for selected users in a computing environment. The system includes a memory storing instructions and an electronic processor coupled to the memory. The electronic processor configured to execute the instructions to determine a set of related service requests submitted by a plurality of users in the computing environment and, for each of the plurality of users, query a server servicing the user for a list of flighted software features enabled for the user during a predetermined time period. The electronic processor is also configured to determine, based on the list of flighted software features enabled for each of the plurality of users during the predetermined time period, a common flighted software feature, and automatically disable the common flighted software feature for at least one of the plurality of users.

Another embodiment provides a method for disabling a flighted software feature enabled for selected users in a computing environment. The method includes accessing, with an electronic processor, service requests submitted by a plurality of users in the computing environment, determining, with the electronic processor, a set of related service requests included in the service requests, and, for each service request included in the set of related service requests, determining, with the electronic processor, a user submitting the service request and determining a server servicing the user. The method also includes, for each service request included in the set of related service requests, querying, with the electronic processor, the server servicing the user for a list of flighted software features enabled for the user during a predetermined time period, determining, with the electronic processor, based on the list of flighted software features enabled for each of the plurality of users during the predetermined time period, a common flighted software feature, and automatically disabling the common flighted software feature for at least one of the plurality of users.

Yet another embodiment provides non-transitory computer-readable medium storing instructions that, when executed with an electronic processor, perform a set of functions. The set of functions includes determining a set of related service requests submitted by a plurality of users in a computing environment and, for each of the plurality of users, querying a server servicing the user for a list of flighted software features enabled for the user during a predetermined time period. The set of functions also includes determining, based on the list of flighted software features enabled for each of the plurality of users during the first predetermined time period, a common flighted software feature, determining a number of users included in the plurality of users who had the common flighted software feature enabled, and automatically remedying the common flighted software feature based on the number of users.

Other aspects of the invention will become apparent by consideration of the detailed description and accompanying drawings.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that a not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical memory, a magnetic memory, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, new software features may be selectively deployed or introduced in a cloud-based computing environment to a subset of users of the environment for testing or experimentation purposes. As used in the present application, this type of controlled delivery of software features is referred to as "flighting," and software features delivered in this manner are referred to as "flighted features" or "flighted software features." As also noted above, flighted software features are independent of other features or functions provided within a cloud-based computing environment, which allows the features to be enabled and disabled without impacting the overall performance of the computing environment.

Figure 1:
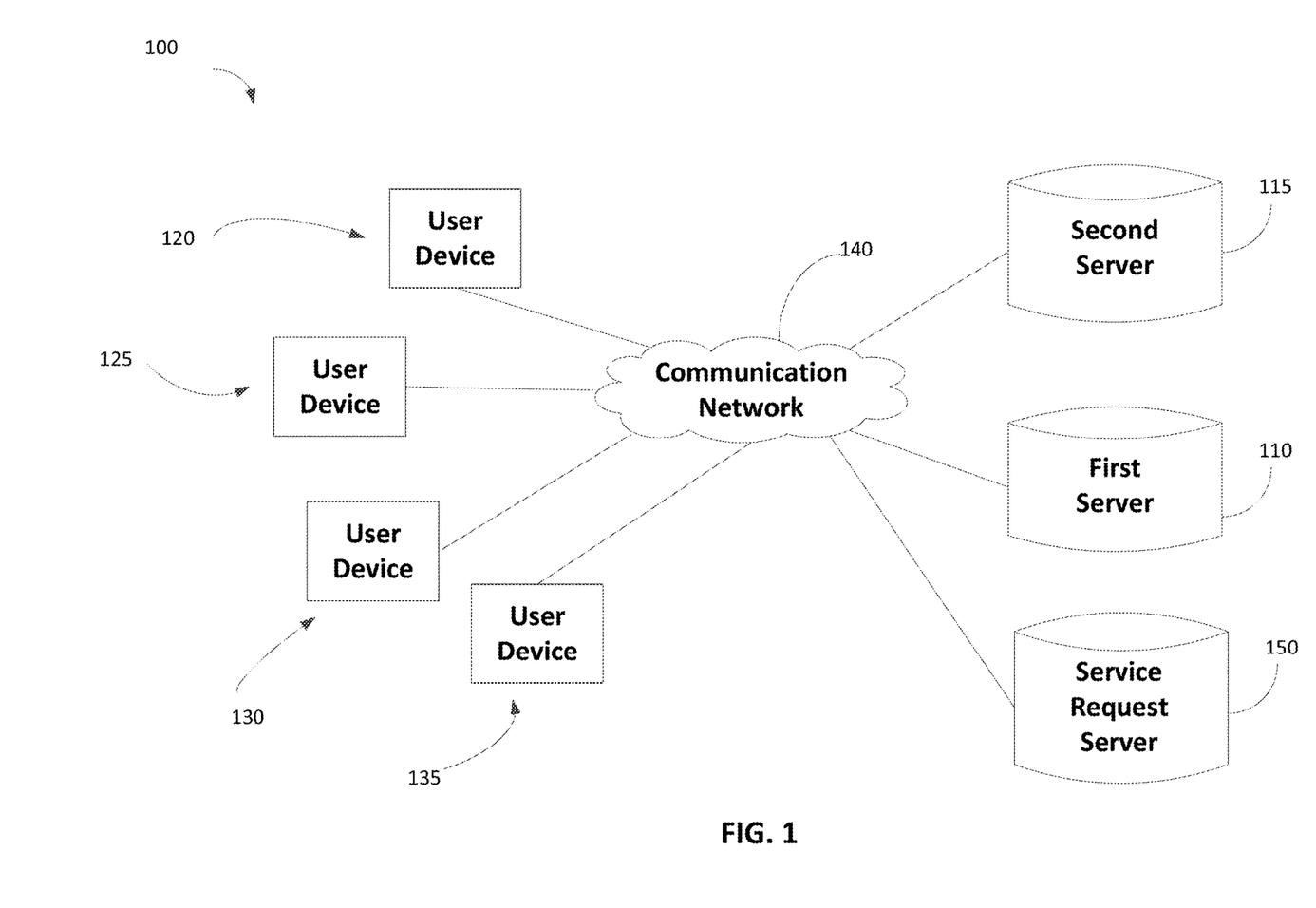
FIG. 1 schematically illustrates a computing environment according to one embodiment.

FIG. 1 schematically illustrates a computing environment 100, such as a cloud-based computing environment. The computing environment 100 includes one or more servers 110, 115 and one or more user devices 120, 125, 130, 135. The servers 110, 115 and the user devices 120, 125, 130, 135 communicate over one or more wired or wireless communication networks 140. Portions of the wireless communication networks 140 may be implemented using a wide area network, such as the Internet, a local area network, such as a Bluetooth™ network or Wi-Fi, and combinations or derivatives thereof. It should be understood that the servers 110, 115 may communicate with any number of user devices, and the four user devices 120, 125, 130, 135 illustrated in FIG. 1 are purely for illustrative purposes. Similarly, it should also be understood that the computing environment 100 may include any number of servers and the two servers 110 and 115 illustrated in FIG. 1 are purely for illustrative purposes. Also, in some embodiments, one of the user devices 120, 125, 130, 135 may communicate with one of the servers 110, 115 through one or more intermediary devices (not shown).

Each user of the user devices 120, 125, 130, 135 is used by a user or tenant of the computing environment 100, and each user device 120, 125, 130, 135 includes an electronic device, such as a smart phone, a smart watch, a tablet computer, a laptop computer, mixed reality headsets, or the like, that includes an electronic processor (for example, a microprocessor, application-specific integrated circuit (ASIC), or another suitable electronic device), a memory (for example, a non-transitory, computer-readable storage medium), and a communication interface such as a transceiver, for communicating over the communication networks 140 and, optionally, one or more additional communication networks or connections.

The users devices 120, 125, 130, 135 communicate with one or more of the servers 110, 115 to access functionality provided via the computing environment 100. As one example, the first server 110 may service users accessing the computing environment 100 via the user devices 120, 125 and the second server 115 may service users accessing the computing environment 100 via the user devices 130, 135. In some embodiments, the first server 110 and the second server 115 represent a server farm or cluster. "Services" or "servicing" as used in the present application includes providing information to a user device, for example, in response to receiving a request from the user device.

Figure 2:
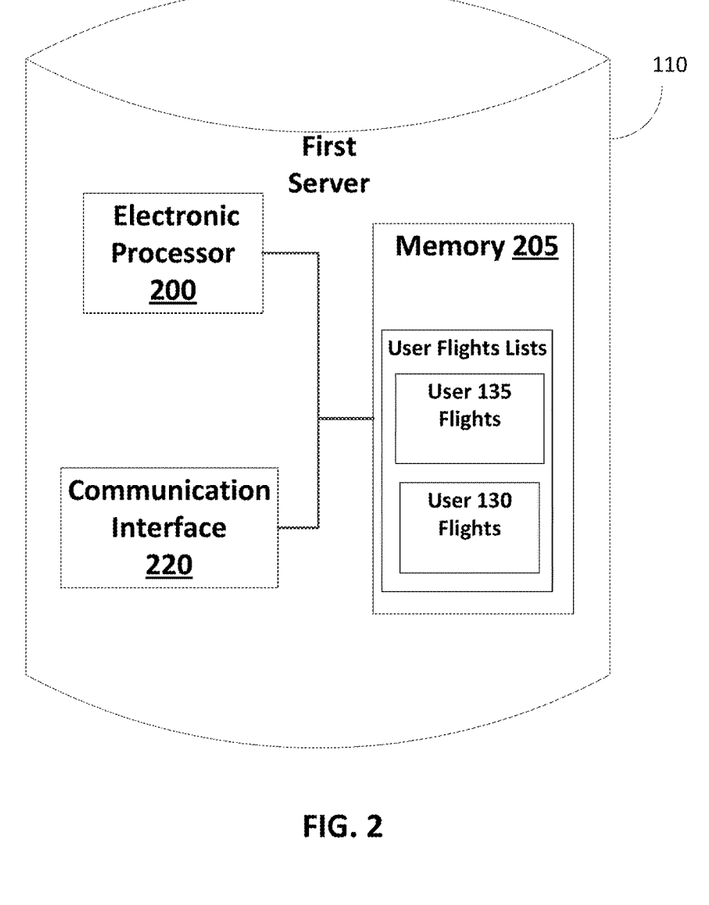
FIG. 2 schematically illustrates a server servicing user devices included in the computing environment of FIG. 1.

As illustrated in FIG. 2, the first server 110 is an electronic device that includes an electronic processor 200 (for example, a microprocessor, application-specific integrated circuit (ASIC), or another suitable electronic device), a memory 205 (a non-transitory, computer-readable storage medium), and a communication interface 220, such as a transceiver, for communicating over the communication networks 140 and, optionally, one or more additional communication networks or connections. The electronic processor 200, the memory 205, and the communication interface 220 communicate over one or more communication lines or buses. It should be understood that the first server 110 may include additional components than those illustrated in FIG. 2 in various configurations and may perform additional functionality than the functionality described in the present application. Also, it should be understood that, although not described or illustrated herein, the second server 115 may include similar components and perform similar functionality as the first server 110.

As illustrated in FIG. 2, the first server 110 stores a user flight list (for example, in the memory 205) for each user device (or user associated with such a user device) serviced by the first server 110. Each user flight list includes a list of flights (identified by unique identifiers) enabled for a user. For example, as illustrated in FIG. 2, the first server 110 stores a list of the flighted software features enabled for the user device 130 and a list of flighted software features enabled for the user device 135. In some embodiments, the first server 110 maintains the lists in a data structure, for example, a hash table, an array, or a linked list.

Figure 3:
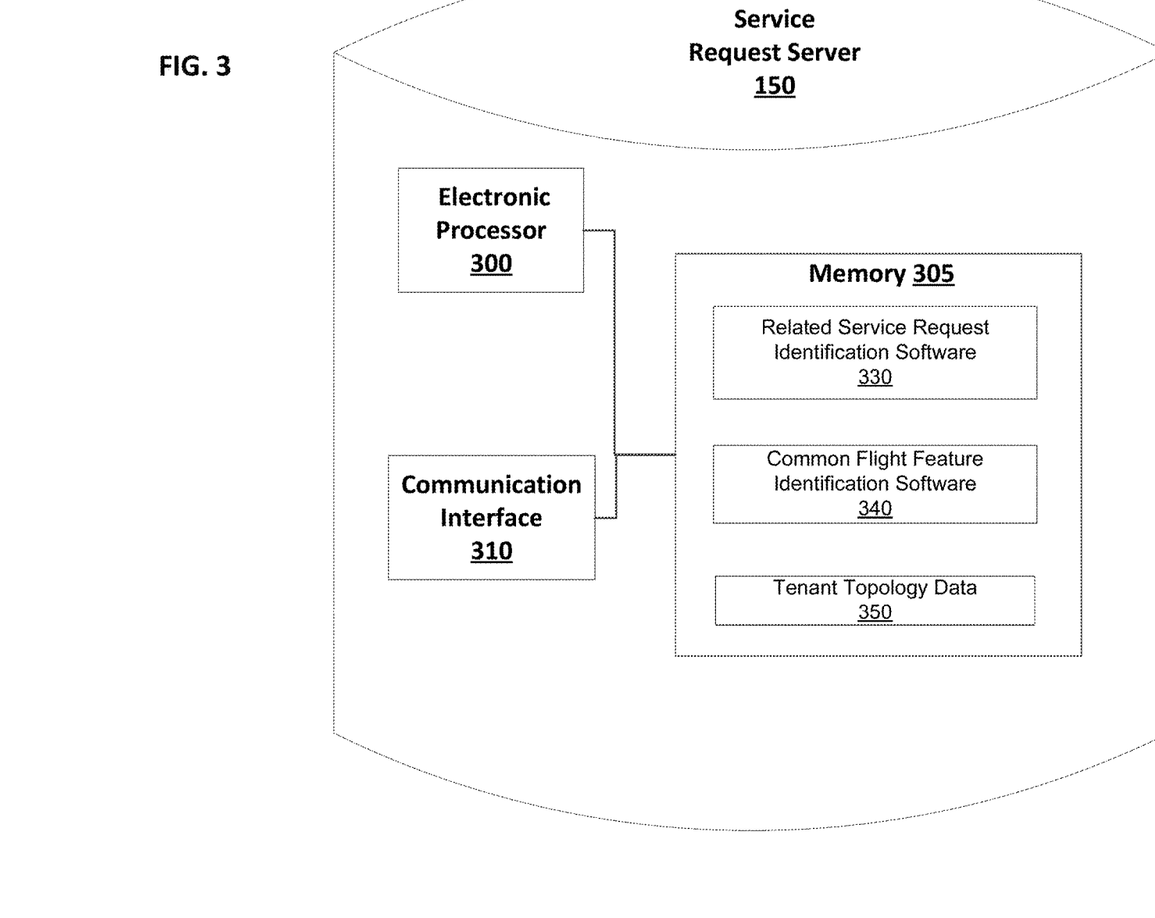
FIG. 3 schematically illustrates a service request server included in the computing environment of FIG. 1.

Returning to FIG. 1, the computing environment 100 also includes a service request server 150. As illustrated in FIG. 3, the service request server 150 is an electronic device that includes an electronic processor 300 (for example, a microprocessor, application-specific integrated circuit (ASIC), or another suitable electronic device), a memory 305 (a non-transitory, computer-readable storage medium), and a communication interface 310, such as a transceiver, for communicating over the communication networks 140 and, optionally, one or more additional communication networks or connections. The electronic processor 300, the memory 305, and the communication interface 310 communicate over one or more communication lines or buses. It should be understood that the service request server 150 may include additional components than those illustrated in FIG. 3 in various configurations and may perform additional functionality than the functionality described in the present application. Also, the functionality described herein as being performed by the service request server 150 may be distributed among multiple devices, such as multiple servers operated within the computing environment 100. For example, in the embodiment described below, the service request server 150 is configured to receive service requests submitted by one or more users. However, in other embodiments, other servers, such as the first server 110 and the second server 115, are configured to receive the service requests and the service request server 150 is configured to receive or access the service requests from the first server 110 and the second server 115. As another example, in the embodiment described below, the service request server 150 is configured to process service requests to determine if a flighted software feature is a cause of the service requests, but, in other embodiments, this processing may be performed by a separate server or distributed among a plurality of services.

The electronic processor 300 included in the service request server 150 executes instructions stored in the memory 305. For example, as illustrated in FIG. 3, the memory 305 stores related service request identification software 330, common flighted feature identification software 340, and tenant topology data 345. It should be understood that the software components illustrated in FIG. 3 may be configured and distributed in various configurations. For example, the related service request identification software 330 may be distributed among a plurality of software components. Similarly, the service request server 150 may store and execute other software components to perform additional functionality than the functionality described herein.

As described in more detail below, the electronic processor 300 executes the related service request identification software 330 to identify a set of related service requests and executes the common flighted feature identification software 340 to determine whether the users submitting the set of related service requests have a common flighted software feature. The electronic processor 300 accesses the tenant topology data 345 to determine what servers to query regarding what flights are enabled for a particular user. For example, the tenant topology data 345 stores information indicating what server included in the computing environment 100 services a particular user (or user device). It should be understood that a user may include an individual user or an entity, such as a corporation, organization, or business, that subscribes to the computing environment 100 on behalf of one or more individual users. Accordingly, when the service request server 150 determines that a service request included in the set of related service requests was submitted by a particular user, the service request server 150 accesses the tenant topology data 345 to determine what server services that user.

Figure 4:
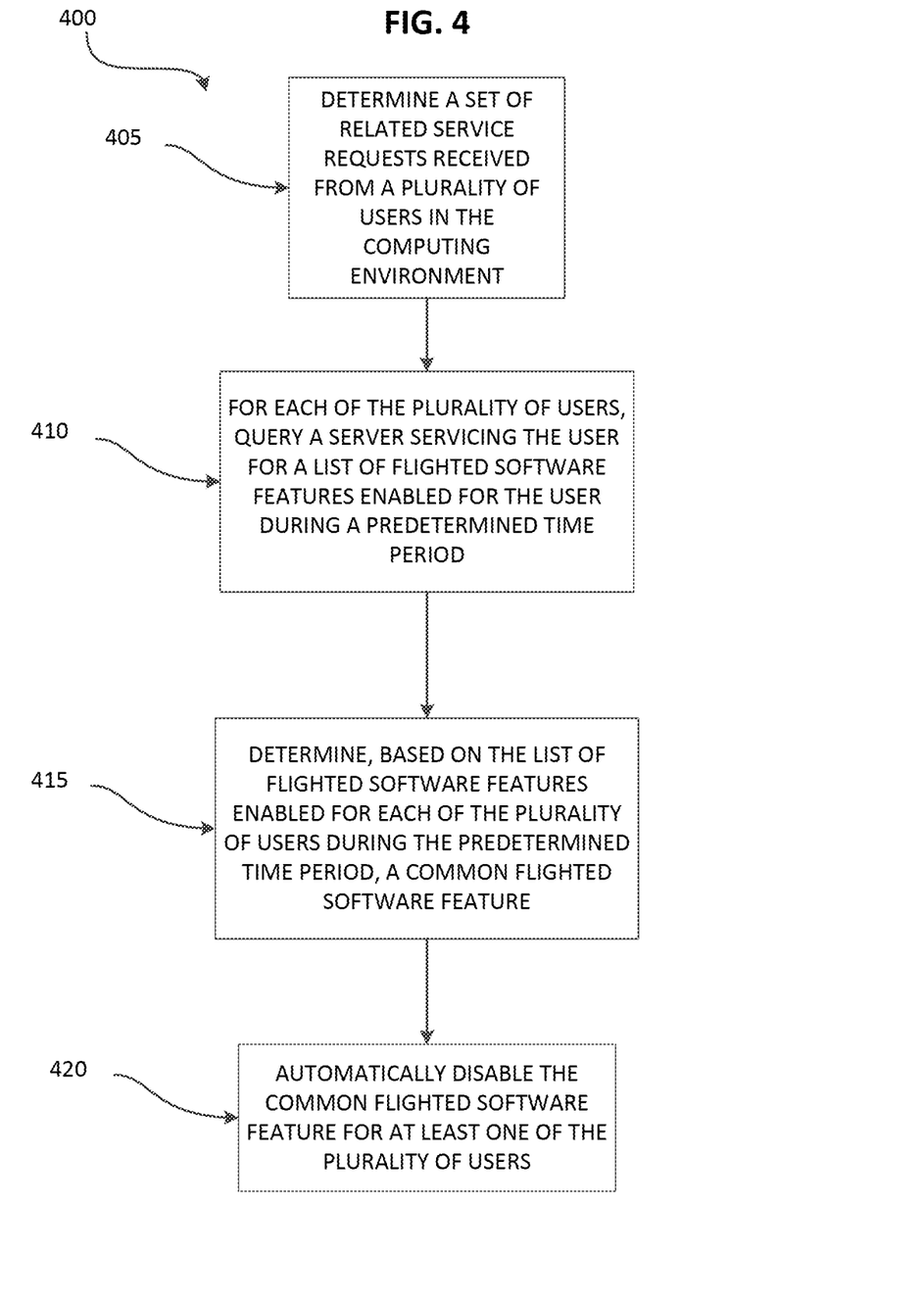
FIG. 4 is a flow chart illustrating a method of disabling a flighted software feature enabled for selected users in the computing environment of FIG. 1 according to one embodiment.

For example, FIG. 4 illustrates a method 400 of automatically disabling a flighted software feature enabled for selected users in a computing environment according to one embodiment. The method 400 is described as being performed by the service request server 150 and, in particular, by the electronic processor 300 executing instructions (the related service request identification software 330 and the common flighted feature identification software 340). However, as noted above, the functionality described herein with respect to FIG. 4 may be distributed among more than one server or computing device.

As illustrated in FIG. 4, the method 400 includes determining, with the electronic processor 300, a set of related service requests submitted by a plurality of users in the computing environment 100 (at block 405). To determine the set of related service requests, the electronic processor 300 may access or retrieve service requests stored in various sources and submitted via various mechanisms. For example, in some embodiments, a user can submit a service request electronically, for example, via a website or other user interface. In other embodiments, a user can submit a service request verbally (for example, over a telephone) by a user calling a customer support line and a customer service representative can create an electronic version of the service request. In some embodiments, the electronic processor 300 accesses service requests (from one or more sources) in real time or near real time to their submission to quickly identify related service requests so that proper remedial action can be taken as described below.

The set of related service requests may be related based on one or more factors, including, for example, time, content, geographic location, or the like. For example, in some embodiments, the set of related service requests includes service requests submitted during a predetermined period of time. In other embodiments, the set of related service requests includes service requests submitted as part of an increase or spike in service requests. For example, when a number of service requests submitted in a predetermined time period is a predetermined percent or numerical value greater than an average number of service requests submitted over a similar predetermined time period (for example, an average daily or hourly number of service requests), the service request server 150 may set the service requests submitted during the predetermined time as the set of related service requests.

As another example, the service request server 150 may be configured to determine the set of related service requests by identifying service requests that are associated with the common keyword (service requests including the same keyword or words similar or related to the same keyword). For example, as described in U.S. patent application Ser. No. 15/395,201, the contents of which are incorporated herein by reference, the service request server 150 (or a separate server) may be configured to generate a plurality of keywords for a service request and track the frequency at which service requests associated with each of the generated keywords are submitted. In response to the number of occurrences of a particular keyword satisfying (for example, equaling or exceeding) a predetermined threshold (which may be set based on historical occurrences of the keyword), the keyword can be identified as a "trend" and service requests associated with the "trend" (including the keyword or other words or phrases similar or related to the keyword) submitted during a predetermined period of time can be included in the set of related service requests.

As described above, the service request server 150 may be configured to execute (via the electronic processor 300) the related service request identification software 330 to determine the set of related service requests. However, alternatively or in addition, the service request server 150 may invoke one or more application programming interfaces (APIs) to determine the set of related service requests. For example, the service request server 150 may invoke a cognitive text analytics API to obtain keywords, trends, or a set of related service requests. The results from the API may be pushed to the common flighted feature identification software 340, which, as described below, may be configured to process the set of related service requests and identify a common flighted feature.

For example, as illustrated in FIG. 4, after determining the set of related service requests, the electronic processor 300 determines a plurality of users submitting requests included in the set of related service requests and, for each of the plurality of users, queries a server servicing the user (at block 410). For example, as described above, the tenant topology data 345 stores information mapping users with particular servers (farm servers) included in the computing environment 100. Accordingly, the electronic processor 300 is configured to use an identifier of a user included in or associated with each of the requests included in the set of related service requests to determine the user who submitted the request and then uses the tenant topology data 345 to determine the server servicing the determined user. After determining the server servicing a user submitting a service request, the electronic processor 300 queries the determined server (for example, the first server 110 or the second server 115) for a list of flights that were enabled for the user. As described above, each of the first server 110 and the second server 115 maintains a flight list for each serviced user, which the server uses to respond to the query.

The query submitted to a server may identify a user (or a plurality of users) and, optionally, a predetermined time period. The predetermined time period may include a time prior to a time period during which the set of related service requests were submitted and may include a time period such as the last 12 hours, 24 hours, 2 days, 5 days, or the like. In some embodiments, the electronic processor 300 varies the predetermined time period based on the set of related service requests, such as the number of requests, the time period over which the service requests were submitted, how long ago the first of the related requests was submitted, or the like. In other embodiments, the predetermined time period includes a static or default time period and, in some embodiments, a server may be configured to respond to such a query by applying a default time period even when the query does not specify a time period.

As illustrated in FIG. 4, the electronic processor 300 determines, by comparing the lists of flighted software features enabled for each of the plurality of users, a common flighted software feature (at block 415). The common flighted software feature is a flighted software feature that is enabled for at least a predetermined percentage of the plurality of users who submitted a service request included in the set of related service requests during the predetermined time period. For example, if 75% or more of the users submitting service requests had the same flight enabled during a particular time period, the flight may be set as the common flighted feature.

After identifying the common flighted feature, the electronic processor 300 automatically disables the common flighted software feature for at least one of the plurality of users submitting service requests (at block 420). In one embodiment, the electronic processor 300 disables the common flighted software feature for only those users who had the common flighted software feature enabled and who submitted a service request included in the set of related service requests. In other embodiments, the electronic processor 300 disables the common flighted software feature for all users who had the common flighted software feature enabled (regardless of whether a user submitted a service request). In some embodiments, the electronic processor 300 determines what users to disable the common flighted software feature for based on the set of related service requests, the scope of the common flighted software feature, or a combination thereof. For example, the electronic processor 300 may be configured determine a number of users who had the common flighted feature enabled and who submitted service requests included in the set of related service requests and divide this number by the total number of users who had the common flighted software feature enabled. If this percentage satisfies (for example, equals or exceeds) a threshold, the electronic processor 300 may disable the flight for all users who had the common flighted software feature enabled (regardless of whether a particular user submitted a service request). For example, if 75% of users who had the common flighted software feature enabled submitted a service request included in the set of related service requests, the electronic processor 300 may be configured to disable the common flighted software feature for all users as compared to just those users who submitted service requests. The electronic processor 300 may similarly consider the number of users submitting service requests (separate from a percentage) when determining how to disable the common flighted software feature. For example, if the number of users submitting service requests satisfies a threshold, the electronic processor 300 may be configured to disable the common flighted software feature for all applicable users.

The electronic processor 300 may be configured disable a flighted feature using an API service used to enable and disable flights. Accordingly, in some embodiments, the service request server 150 may provide an end-to-end recovery process once a correlation is determined between service requests and a particular flighted feature.

As an alternative to disabling a flighted feature, the electronic processor 300 may be configured to recover or remedy the flighted feature in other manners, including changing a mode of operation of the flighted feature (a recovery or limited operation mode as compared to normal mode), changing the scope of a flighted feature in the current or future iteration, or the like. In some embodiments, the electronic processor 300 may dynamically determine how to remedy a common flighted software feature based on characteristics of the feature (scope, complexity, and the like), the set of related service requests (size, duration, frequency, and the like), or the like.

Thus, the embodiments described in this disclosure provide, among other things, systems and methods for correlating service requests with a recently-flighted software feature with spikes in service requests and automatically remedying (disabling) the flighted software feature. In particular, by listening for elevated volumes in service requests and identifying patterns or trends (such as through keywords), the systems and methods described herein can automatically identify a feature likely responsible for service requests and automatically take remedial action, including, for example, automatically disabling a flighted feature for one or more users of a computing environment.

Various features and advantages are set forth in the following claims.

What is claimed is:

1. A system for disabling a flighted software feature enabled for selected users in a computing environment, the system comprising:
    a memory storing instructions;
    an electronic processor coupled to the memory, the electronic processor configured to execute the instructions to:
        determine a set of related service requests submitted by a plurality of users in the computing environment;
        for each of the plurality of users, query a server servicing the user for a list of flighted software features enabled for the user during a predetermined time period;
        determine, based on the list of flighted software features enabled for each of the plurality of users during the predetermined time period, a common flighted software feature; and
        automatically disable the common flighted software feature for at least one of the plurality of users.

2. The system according to claim 1, wherein the set of related service requests includes service requests associated with a common keyword.

3. The system according to claim 1, wherein the electronic processor is configured determine the set of related service requests by determining when more than an average number of service requests are submitted during a second predetermined time period.

4. The system according to claim 1, wherein the predetermined time period includes a time prior to a time period during which the set of related service requests were submitted.

5. The system according to claim 1, wherein the electronic processor is configured to query the server servicing each of the plurality of users by accessing tenant topology data to determine the server servicing each of the plurality of users.

6. The system according to claim 1, wherein the common flighted software feature is a flighted software feature enabled for a predetermined percentage of the plurality of users during the predetermined time period.

7. The system according to claim 1, wherein the electronic processor is configured to automatically disable the common flighted software feature by disabling the common flighted software feature for each of the plurality of users who had the common flighted software feature enabled.

8. The system according to claim 1, wherein the electronic processor is further configured to determine a number of users who had the common flighted software feature enabled and submitted service requests included in the set of related service requests and divide the number of users by a total number of users who had the common flighted software feature enabled to determine a percentage, wherein the electronic processor is configured to automatically disable the common flighted software feature by disabling the common flighted software feature for each user who had the common flighted software feature enabled in response to the percentage satisfying a threshold.

9. A method for disabling a flighted software feature enabled for selected users in a computing environment, the method comprising:
    accessing, with an electronic processor, service requests submitted by a plurality of users in the computing environment;
    determining, with the electronic processor, a set of related service requests included in the service requests;
    for each service request included in the set of related service requests, determining, with the electronic processor, a user submitting the service request and determining a server servicing the user;
    for each service request included in the set of related service requests, querying, with the electronic processor, the server servicing the user for a list of flighted software features enabled for the user during a predetermined time period;
    determining, with the electronic processor, based on the list of flighted software features enabled for each of the plurality of users during the predetermined time period, a common flighted software feature; and
    automatically disabling the common flighted software feature for at least one of the plurality of users.

10. The method according to claim 9, wherein determining the set of related service requests includes determining service requests associated with a common keyword.

11. The method according to claim 9, wherein determining the set of related service requests includes determining when more than an average number of service requests were submitted during a second predetermined time period.

12. The method according to claim 9, wherein querying the server servicing each of the plurality of users includes accessing tenant topology data to determine the server servicing each of the plurality of users.

13. The method according to claim 9, wherein determining the common flighted software feature includes determining a flighted software feature enabled for a predetermined percentage of the plurality of users during the predetermined time period.

14. The method according to claim 9, wherein automatically disabling the common flighted software feature includes disabling the common flighted software feature for each of the plurality of users who had the common flighted software feature enabled.

15. The method according to claim 9, further comprising determining a number of users who had the common flighted software feature enabled and submitted service requests included in the set of related service requests and dividing the number of users by a total number of users who had the common flighted software feature enabled to determine a percentage, wherein automatically disabling the common flighted software feature includes disabling the common flighted software feature for each user who had the common flighted software feature enabled in response to the percentage satisfying a threshold.

16. Non-transitory computer-readable medium storing instructions that, when executed with an electronic processor, perform a set of functions, the set of functions comprising:
- determining a set of related service requests submitted by a plurality of users in a computing environment;
- for each of the plurality of users, querying a server servicing the user for a list of flighted software features enabled for the user during a predetermined time period;
- determining, based on the list of flighted software features enabled for each of the plurality of users during the first predetermined time period, a common flighted software feature;
- determining a number of users included in the plurality of users who had the common flighted software feature enabled; and
- automatically remedying the common flighted software feature based on the number of users.

17. The non-transitory computer-readable medium according to claim 16, wherein determining the common flighted software feature includes determining a flighted software feature enabled for a predetermined percentage of the plurality of users during the predetermined time period.

18. The non-transitory computer-readable medium according to claim 16, wherein automatically remedying the common flighted software feature includes disabling the common flighted software feature for at least one of the plurality of users.

19. The non-transitory computer-readable medium according to claim 16, wherein automatically remedying the common flighted software feature based on the number of users includes disabling the common flighted software feature for each user who had the common flighted software feature enabled in response to the number of users satisfying a threshold.

20. The non-transitory computer-readable medium according to claim 16, wherein the set of functions further includes determining a total number of users who had the common flighted software feature and dividing the total number of users by the number of users to generate a percentage and wherein automatically remedying the common flighted software feature based on the number of users includes disabling the common flighted software feature for each user who had the common flighted software feature enabled in response to the percentage satisfying a threshold.

* * * * *